(12) United States Patent
Cardine et al.

(10) Patent No.: US 8,555,549 B2
(45) Date of Patent: Oct. 15, 2013

(54) WINDOW REGULATOR CABLE TENSIONER

(75) Inventors: Patrice Cardine, Orleans (FR); Denis Chevy, Neuvy en Sullias (FR); Christophe Gavaret, Bray en Val (FR)

(73) Assignee: Inteva Products France SAS (FR)

( * ) Notice: Subject to any disclaimer, the term of this patent is extended or adjusted under 35 U.S.C. 154(b) by 2541 days.

(21) Appl. No.: 10/891,420

(22) Filed: Jul. 14, 2004

(65) Prior Publication Data

US 2005/0016070 A1 Jan. 27, 2005

(30) Foreign Application Priority Data

Jul. 18, 2003 (FR) ...................................... 03 08803

(51) Int. Cl.
*E05F 11/48* (2006.01)

(52) U.S. Cl.
USPC ........................... 49/352; 49/349; 74/501.5 R

(58) Field of Classification Search
USPC .................. 49/352, 348, 349, 502, 360, 362; 74/501.5 R; 192/111.11, 111.12; 411/414, 536; 254/231, 232, 233, 234
See application file for complete search history.

(56) References Cited

U.S. PATENT DOCUMENTS

| | | | | | |
|---|---|---|---|---|---|
| 2,957,354 | A | * | 10/1960 | Morrow | 74/502 |
| 3,028,157 | A | * | 4/1962 | Batley | 49/352 |
| 4,074,463 | A | * | 2/1978 | Colanzi | 49/352 |
| 4,344,518 | A | * | 8/1982 | Gilmore | 192/111.12 |
| 4,378,713 | A | * | 4/1983 | Haskell et al. | 74/501.5 R |
| 4,433,508 | A | * | 2/1984 | Carletta | 49/348 |
| 4,598,809 | A | * | 7/1986 | Glover et al. | 192/111.12 |
| 4,657,523 | A | * | 4/1987 | Chevance et al. | 49/352 |
| 4,753,124 | A | * | 6/1988 | Chevance | 74/501.5 R |
| 4,805,346 | A | * | 2/1989 | Gergoe | 49/352 |
| 4,887,705 | A | * | 12/1989 | Solano et al. | 192/111.12 |
| 5,044,222 | A | * | 9/1991 | Tanaka et al. | 49/352 |
| 5,138,897 | A | * | 8/1992 | Beard et al. | 74/501.5 R |
| 5,544,543 | A | | 8/1996 | Gunter | |
| 5,787,644 | A | * | 8/1998 | Thomsen, Jr. | 49/348 |
| 5,950,365 | A | * | 9/1999 | Lieb et al. | 49/352 |
| 6,193,621 | B1 | | 2/2001 | McClosky | |
| 7,325,360 | B2 | * | 2/2008 | Mazouzi et al. | 49/352 |
| 2003/0140562 | A1 | * | 7/2003 | Staser et al. | 49/352 |
| 2005/0194580 | A1 | * | 9/2005 | Mazouzi et al. | 254/231 |

FOREIGN PATENT DOCUMENTS

| | | | |
|---|---|---|---|
| DE | 3737733 C | * | 5/1988 |
| EP | 0 244 303 | | 11/1987 |
| EP | 607589 A1 | * | 7/1994 |

OTHER PUBLICATIONS

French Search Report dated Mar. 16, 2004.
European Search Report dated Jul. 24, 2007.

* cited by examiner

*Primary Examiner* — Gregory J. Strimbu
(74) *Attorney, Agent, or Firm* — Cantor Colburn LLP

(57) ABSTRACT

A window regulator cable tensioner includes a screw and nut assembly having an irreversible thread lead angle, a first spring to absorb reversible slack in the cable, and a second spring to actuate movement of the screw and nut assembly. The stiffness of the first spring is greater than the stiffness of the second spring. The cable tensioner absorbs the reversible slack in the cable differently from irreversible slack in the cable.

25 Claims, 4 Drawing Sheets

WINDOW REGULATOR CABLE TENSIONER

REFERENCE TO RELATED APPLICATION

This application claims priority to French Patent Application FR 0308803 filed Jul. 18, 2003.

TECHNICAL FIELD

The present invention relates to a window regulator cable tensioner that absorbs both reversible slack and irreversible slack in a cable of a window regulator.

BACKGROUND OF THE INVENTION

A window regulator is used in a motor vehicle to transmit a drive force to a window in the motor vehicle. The window regulator includes a drive unit (such as a cable or a belt) connected to a drive device (such as a crank or a motor) that transmits a drive force to the window regulator. The window may be driven by slides that are moveable along tracks under the action of the cable. The cable may be split into a lower cable and an upper cable wound in opposite directions on a drum driven by the motor.

The tension in the cable in the window regulator must be effectively controlled. Slack in the cable leads to inaccuracy in the operation of the window regulator and inaccuracy in the position of the slides relative to the position of the drum. On the other hand, overtension in the cable can prematurely wear the window regulator components.

The operating accuracy of the window regulator is important, especially for a window regulator utilized in a frameless door. In certain models of window regulators used in frameless doors, the window lowers slightly when the door is opened to disengage from the roof seal. The window must therefore be moved accurately so that the opening of the door is not hindered. The movement must also not be too great to meet regulatory constraints, in particular anti-pinch regulations. There must therefore be sufficient tension in the window drive cable to ensure accurate movement of the window.

The components of the window regulator device are subject to gradual aging, which can lead to elongation of the cable due to, for example, wear on the driving drum and the pulleys, the compression of the cable sheaths, or creep in the pulleys. Cable elongation due to aging of the various parts of the window regulator must be compensated for.

Moreover, when the window is being raised, the drive motor still applies torque to the window regulator device when the window reaches its upper limit. The overtorque at the upper limit can cause elastic deformation of the window regulator components and cause elastic elongation of the cable and the other stressed units.

Play compensation mechanisms are employed to absorb the elongation of the cable and ensure sufficient tension for the correct operation of the window regulator device.

European patent application No. EP 0,244,303 discloses a play compensation mechanism including a tensioner screw and a nut compressed by a pusher and a flexible unit. In one direction, the screw helically moves in the nut under the axial thrust of the flexible unit when the force exerted by the pusher is removed or reduced. In the other direction, the screw cannot translate or rotate in the nut. This mechanism is an irreversible friction-based system. Thus, when play is likely to occur between two parts linked to the tensioner screw, the play is automatically compensated for when it appears due to the one-way movement of the screw relative to the screw.

However, this mechanism also compensates equally for elongation of the cable due to the aging of the window regulator device and for elastic deformation caused by the drive torque when the window regulator mechanism is at its upper limit. The elastic deformation, which appears the first time the window regulator is maneuvered to its upper limit, can be as much as 5 to 8 mm and is approximately constant during subsequent maneuvers. However, this deformation is eliminated when the drive torque is released.

The mechanism described in European Patent Application EP 0,244,303 compensates for elastic deformation, leading to overtension in the cable and premature deterioration of the cable. When there is overtension in the cable, the premature wear of the components in the mechanism deteriorates the window regulator mechanism after a few thousand cycles, whereas the target lifetime of the mechanism is several tens of thousands of cycles.

There is therefore a need for a cable tensioner in a window regulator device that can irreversibly compensate for elongation caused by wear and reversibly compensate for elastic deformation.

SUMMARY OF THE INVENTION

The window regulator cable tensioner of the present invention includes a screw and nut assembly having an irreversible thread lead angle, a first spring to absorb reversible slack in the cable, and a second spring to actuate the screw and nut assembly. The stiffness of the first spring is greater than the stiffness of the second spring.

In one embodiment, the second spring actuates the screw in the nut when the first spring is fully expanded.

According to one embodiment, the stiffness of the first spring is such that the first spring provides a restoring force between 60 N and 80 N. According to another embodiment, the stiffness of the second spring is such that the second spring provides a restoring force between 25 N and 40 N. According to one embodiment, the first spring expands to a length between 2 and 8 mm.

According to one embodiment, the first spring is arranged in series with the screw and nut assembly. According to one embodiment, the first spring is compressed against the screw by a cable sheath centered on the cable. According to another embodiment, the second spring is arranged in parallel with the screw and nut assembly. The nut can form a fixed stop and the screw can form a movable stop for the second spring.

The invention also provides a window regulator including a tensioned cable that actuates the movement of a window glass and the cable tensioner according to the present invention. The first spring absorbs reversible slack in the cable when the window is at its upper limit, and the second spring actuates the screw and nut assembly in the event of irreversible slack due to wear.

The invention also provides a frameless door including the window regulator according to the invention.

Other characteristics and advantages of the invention are given in the following detailed description of the embodiments of the invention, given by way of example only and with reference to the appended drawings.

DETAILED DESCRIPTION OF THE PREFERRED EMBODIMENT

Figure 1:
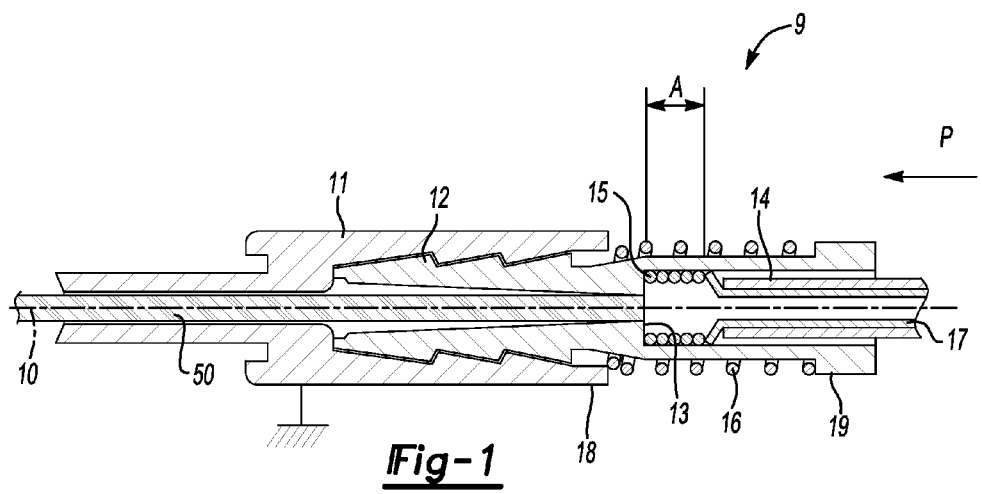
FIG. 1 illustrates a cable tensioner according to the present invention when the cable is tight.

The cable tensioner according to the present invention is arranged in the cable run of a window regulator device. It is preferably located on the lower cable of the mechanism, which is the "slack side" of the mechanism when the window regulator device is at its upper limit.

When the cable slackens either because of mechanical wear due to aging or elastic deformation caused by drive overtorque when the window regulator device is at its upper limit, the cable tensioner absorbs the elongation by extending the cable run.

The cable tensioner according to the present invention presents two separate complementary mechanisms that compensate for the elongation of the cable run. The cable tensioner includes a first spring that absorbs reversible slack in the cable (in particular in the lower cable) caused by the elastic deformation of the upper cable. The cable tensioner also includes a screw and nut assembly having an irreversible thread lead angle and a second spring that actuates the screw and nut assembly when the elongation is irreversible. The stiffness of the first spring is greater than the stiffness of the second spring. The second spring actuates the irreversible cable slack compensation mechanism and is only acted upon after the first spring that actuates the reversible cable slack compensation mechanism is acted upon. Thus, the cable will not be overtensioned because of inappropriate compensation for the elongation of the cable, in particular in the event of reversible elongation when the window regulator device is at its upper limit.

The invention will be described in detail with reference to FIGS. 1 and 2. The cable tensioner 9 is centered on an axis 10 of a cable run of a window regulator device 52 (shown in FIG. 3). The cable tensioner 9 includes a screw and nut assembly. The nut 11 is fixed and the screw 12 is moveable relative to the nut 11. The screw and nut assembly includes an irreversible thread lead angle. For example, the screw 12 and the nut 11 have a complementary helix angle (the screw 12 including threads is shown in FIG. 3) such that the screw 12 can helically move relative to the nut 11 in one direction under axial stress from a flexible unit, and the screw 12 cannot translate or rotate relative to the nut 11 in the opposite direction.

The cable tensioner 9 according to the invention further includes a first spring 15 and a second spring 16. The stiffness of the first spring 15 is significantly greater than the stiffness of the second spring 16. For example, the stiffness of the first spring 15 is such that the first spring 15 provides a restoring force between 60 N and 80 N, and the stiffness of the second spring 16 is such that the second spring 16 provides a restoring force between 25 N and 40 N.

According to the embodiment illustrated, the first spring 15 is arranged in series with the screw 12 and the nut 11. That is, the first spring 15 extends from the screw 12. The first spring 15 is, for example, compressed against an internal collar 13 of the screw 12 by a cable sheath 17 on a cable 50. A sleeve 14 may be centered on the axis 10 of the cable run and inserted into the cable sheath 17 to strengthen the assembly, for example.

When the cable 50 is tight, the first spring 15 is compressed and has a length A. When in a compressed state, the first spring 15 exerts a force f on the cable sheath 17 opposite to the tension P exerted by the tensioned cable sheath 17, with the tension P of the cable sheath 17 being equivalent to the tension in the cable.

According to the embodiment illustrated, the second spring 16 is arranged in parallel with the screw 12 and the nut 11. The nut 11 may form a fixed stop for the second spring 16, and the second spring 16 may, for example, abut against one end 18 of the nut 11. The screw 12 may form a movable stop for the second spring 16, and the second spring 16 may, for example, abut against an external collar 19 on the screw 12. When in a compressed state, the second spring 16 exerts a force F on the screw 12 opposite to the tension P exerted by the tensioned cable sheath 17.

Figure 2:
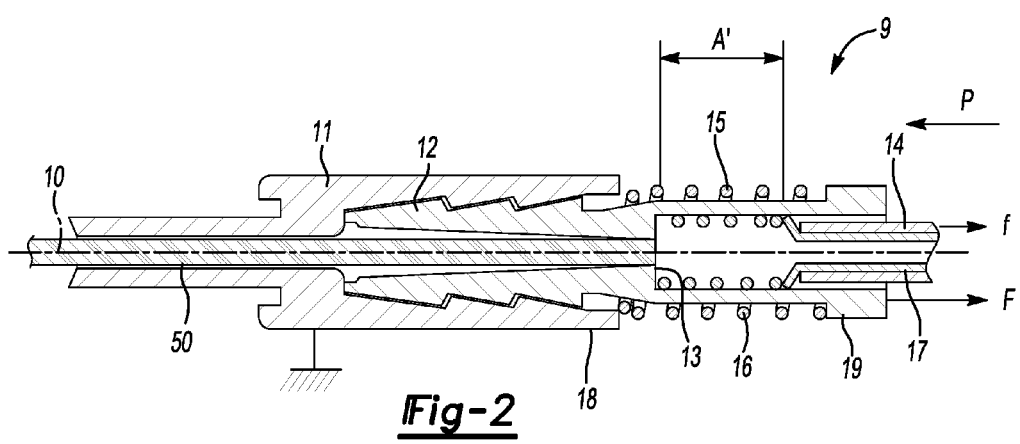
FIG. 2 illustrates a cable tensioner according to the present invention when the cable is slack.
Figure 3:
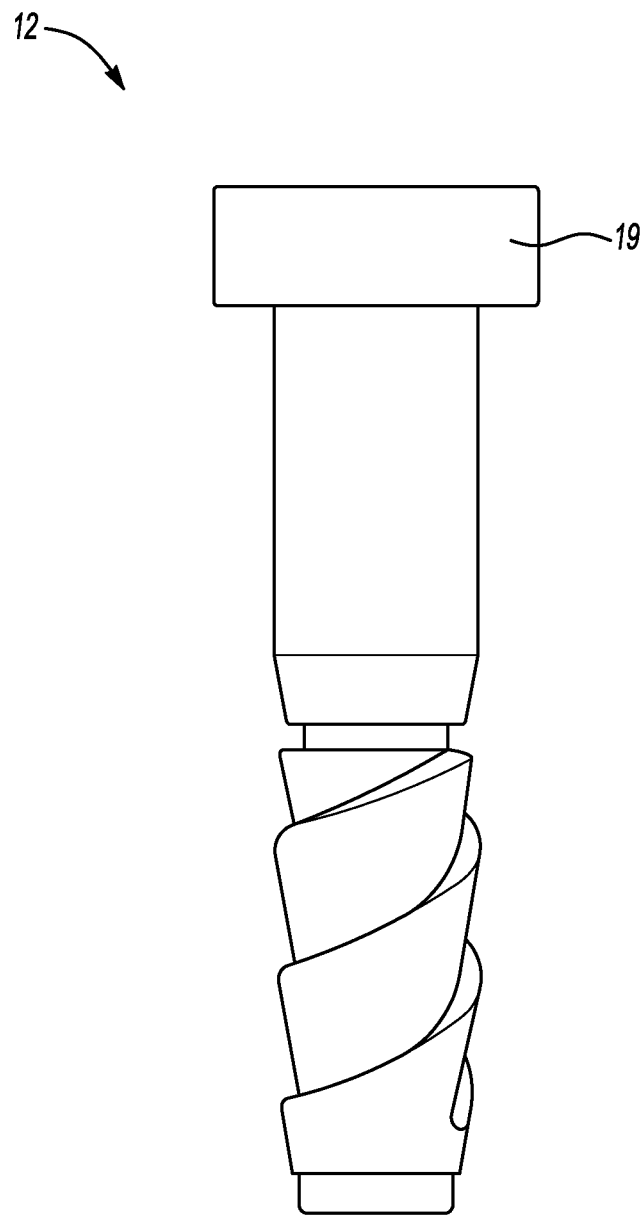
FIG. 3 illustrates a side view of a screw.

A comparison of FIGS. 1 and 2 illustrates the operation of the cable tensioner 9 according to the invention. When the cable 50 is tight, the cable 50 exerts a tension P on the cable tensioner 9 between 80 N to 100 N. The tension P is great enough to retain the first spring 15 and the second spring 16 in a compressed state. That is, the tension P is much greater than the respective restoring forces f and F of the first spring 15 and the second spring 16, respectively.

When the cable 50 slackens because of, for example, elastic deformation caused by overtorque applied by the motor when the window regulator device 52 is at its upper limit, the tension P decreases. The stiffness of the first spring 15 is selected so that the restoring force f then becomes greater than the tension P and the first spring 15 extends, possibly to a length A'.

If the slack in the cable 50 is simply due to the position of the window regulator device 52 at its upper limit, the extension of the first spring 15 to the length A' of 2 to 8 mm is sufficient to compensate for the slack in the cable 50 and extend the cable run to return the cable 50 to a tensioned state. The length A' of the first spring 15 is selected in accordance with the elastic deformation of the cable 50 that is likely to occur when the window regulator device 52 is at its upper limit, and therefore varies depending mainly on the torque of the motor and the length of the cable 50.

The extension of the first spring 15 is completely independent of the second spring 16 and the nut 11 and the screw 12. The stiffness of the second spring 16 is less than the stiffness of the first spring 15, and the second spring 16 retains its state when the first spring 15 extends under the effect of the force f, which is greater than the tension P. However, the restoring force F of the second spring 16 remains lower than the tension P. Thus, the second spring 16, kept in its state, does not cause movement of the screw 12. As a result, no irreversible elongation is introduced by the screw 12 and the nut 11 when the tension P is reduced due to reversible elastic deformation.

When the overtorque from the motor is released or when the window regulator device 52 actuates the cable 50 again, for example by lowering a window 72 (shown in FIG. 4), the tension P in the cable 50 again becomes greater than the force f exerted by the first spring 15, and the first spring 15 returns to the compressed state once again. The first spring 15 therefore reversibly absorbs the elastic deformation of the cable 50 and prevents permanent overtension of the cable 50 in the window regulator device 52.

However, if the slack in the cable sheath 17 remains despite the elongation of the first spring 15 to the length A', for example due to wear of certain parts of the window regulator device 52, the restoring force F of the second spring 16 becomes greater than the tension P. The second spring 16 extends against the tension P in the cable sheath 17 and actuates movement of the screw 12 relative to the nut 11.

If the screw 12 moves irreversibly to extend the cable run and thus absorb the elongation due to wear because of the effect of the restoring force F of the second spring 16, the cable 50 becomes tight, and the tension P in the cable 50 again becomes greater than the restoring forces f and F of the first spring 15 and the second spring 16, respectively, which are then again compressed. A new cable elongation absorption cycle can then occur if necessary on the same principle.

FIG. 3 illustrates the window regulator device 52 including the cable tensioner 9. The cable 50 passes into the cable sheath 17 and runs along the length of the cable run. A cable window drum housing 66 is arranged along the cable run of the cable 50. The cable tensioner 9 is located between the cable sheath 17 and the cable window drum housing 66. The window regulator device 52 may also include a slide 64 to be fixed to the window 72 and a cable winding drum 68.

Figure 4:
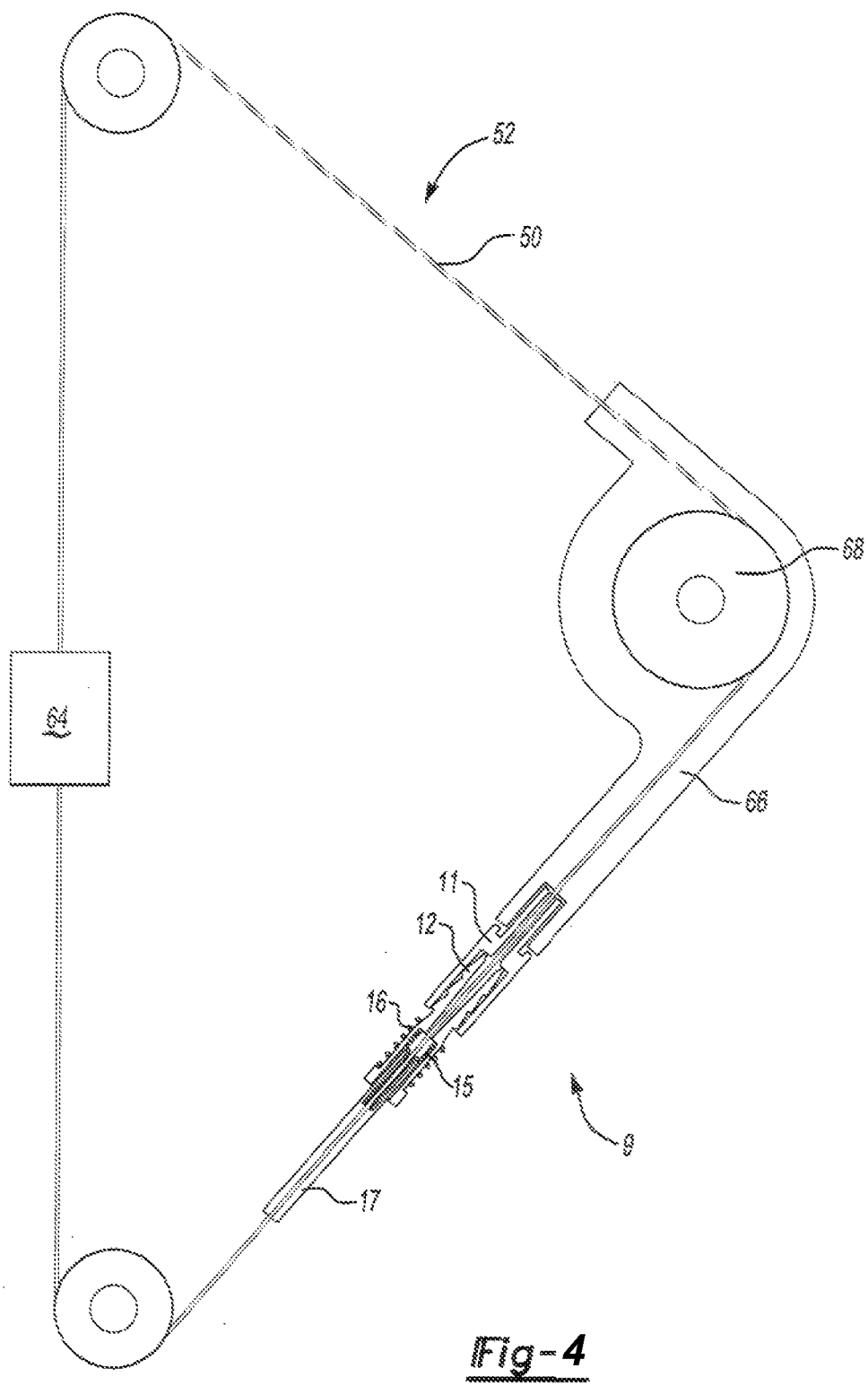
FIG. 4 illustrates a window regulator device including the cable tensioner.
Figure 5:
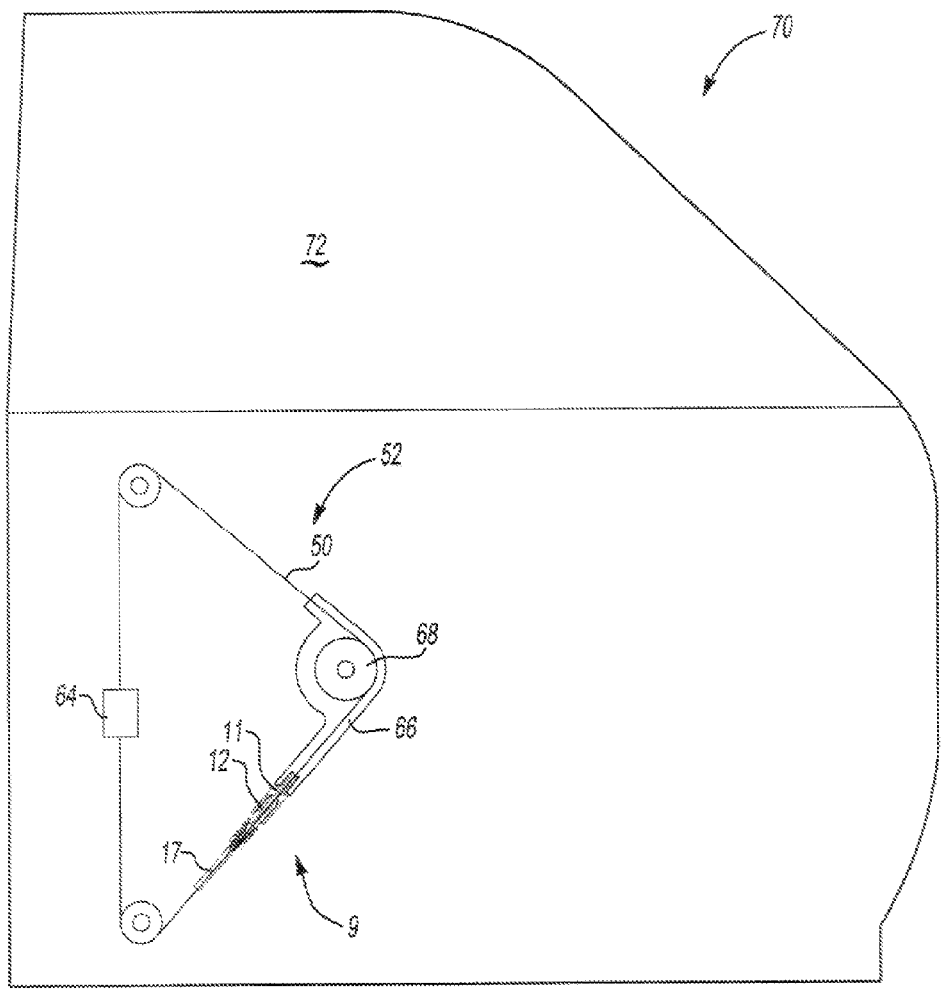
FIG. 5 illustrates a frameless door including the window regulator device.

Thus, as shown in FIG. 4, the present invention provides a window regulator device 52, in particular for a frameless door 70, including a tensioned cable 50 that actuates the movement of a window 72. The window regulator device 52 includes a cable tensioner 9 designed to absorb reversible slack in the cable 50 when the window 72 is at its upper limit and to absorb irreversible slack in the cable 50 due to wear without overtensioning the cable 50.

Of course, this invention is not limited to the embodiments described by way of example. Thus, the arrangement of the first spring 15 and the second spring 16 and the direction of actuation of the screw 12 in the nut 11 can be adjusted according to the embodiments of the cable tensioner 9.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A window regulator cable tensioner comprising:
a threaded assembly including an irreversible thread lead angle, wherein the threaded assembly comprises a nut and a screw;
a first resilient member having a first stiffness to absorb reversible slack in a cable; and
a second resilient member having a second stiffness to actuate movement of the screw relative to the nut, wherein the first stiffness of the first resilient member is greater than the second stiffness of the second resilient member, and the second resilient member actuates the movement of the screw relative to the nut when the first resilient member is fully expanded.

2. The window regulator cable tensioner according to claim 1, wherein the first resilient member provides a first restoring force between 60 N and 80N.

3. The window regulator cable tensioner according to claim 1, wherein the second resilient member provides a second restoring force between 25 N and 40 N.

4. The window regulator cable tensioner according to claim 1, wherein the first resilient member expands to a length between 2 and 8 mm to absorb the reversible slack in the cable.

5. The window regulator cable tensioner according to claim 1, wherein the first resilient member is arranged in series with the threaded assembly.

6. The window regulator cable tensioner according to claim 5, further including a cable sheath centered on the cable, wherein the first resilient member is compressed against the screw by the cable sheath.

7. The window regulator cable tensioner according to claim 1, wherein the second resilient member is arranged in parallel with the threaded assembly.

8. The window regulator cable tensioner according to claim 7, wherein the nut forms a fixed stop and the screw forms a movable stop, and the second resilient member is located between the fixed stop and the moveable stop.

9. The window regulator cable tensioner according to claim 1, wherein the second resilient member contacts an end of the nut and a portion of the screw.

10. The window regulator cable tensioner according to claim 1, wherein the second resilient member is located outside the screw and the first resilient member is located in a cavity inside the screw.

11. The window regulator cable tensioner according to claim 1, wherein the second resilient member surrounds the first resilient member.

12. The window regulator cable tensioner according to claim 1, wherein the first resilient member and the second resilient member are co-axial.

13. A window regulator comprising:
a cable to actuate movement of a window; and
a cable tensioner including a threaded assembly having an irreversible thread lead angle, the threaded assembly including a screw and a nut, the cable tensioner including a first resilient member having a first stiffness to absorb reversible slack in the cable, and a second resilient member having a second stiffness to actuate movement of the screw relative to the nut, the first stiffness of the first resilient member being greater than the second stiffness of the second resilient member, wherein the first resilient member absorbs the reversible slack in the cable when the window is at an upper limit and the second resilient member actuates the threaded assembly to absorb irreversible slack in the cable due to wear.

14. The window regulator according to claim 13, wherein the second resilient member actuates movement of the screw relative to the nut when the first resilient member is fully expanded.

15. The window regulator according to claim 13, wherein the first resilient member provides a first restoring force between 60 N and 80 N.

16. The window regulator according to claim 13, wherein the second resilient member is located outside the screw and the first resilient member is located in a cavity inside the screw.

17. The window regulator according to claim 13, wherein the second resilient member provides a second restoring force between 25 N and 40 N.

18. The window regulator according to claim 13, wherein the second resilient member contacts an end of the nut and a portion of the screw.

19. The window regulator according to claim 13, wherein the first resilient member expands to a length between 2 and 8 mm to absorb the reversible slack in the cable.

20. The window regulator according to claim 13, wherein the first resilient member is arranged in series with the threaded assembly.

21. The window regulator according to claim 20, further including a cable sheath centered on the cable, wherein the first resilient member is compressed against the screw by the cable sheath.

22. The window regulator according to claim 13, wherein the second resilient member is arranged in parallel with the threaded assembly.

23. The window regulator according to claim 22, wherein the nut forms a fixed stop and the screw forms a movable stop, and the second resilient member is located between the fixed stop and the moveable stop.

24. The window regulator according to claim 13, wherein the second resilient member surrounds the first resilient member.

25. The window regulator according to claim 13, wherein the first resilient member and the second resilient member are co-axial.

* * * * *